H. N. GRESLEY.
RAILWAY AND TRAMWAY VEHICLE.
APPLICATION FILED APR. 26, 1921.

1,412,053.

Patented Apr. 11, 1922.
2 SHEETS—SHEET 1.

Inventor
Herbert N. Gresley
by Herbert W. Jenner
Attorney

H. N. GRESLEY.
RAILWAY AND TRAMWAY VEHICLE.
APPLICATION FILED APR. 26, 1921.
1,412,053.
Patented Apr. 11, 1922.
2 SHEETS—SHEET 2.
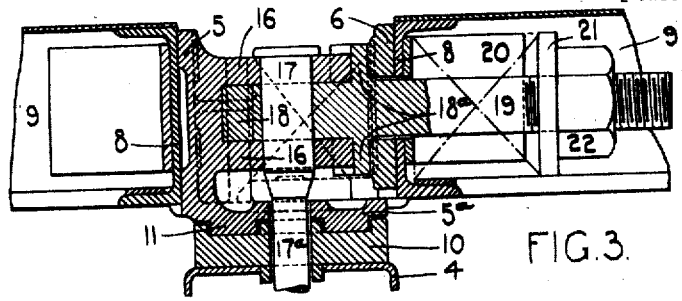
FIG. 3.
FIG. 4.
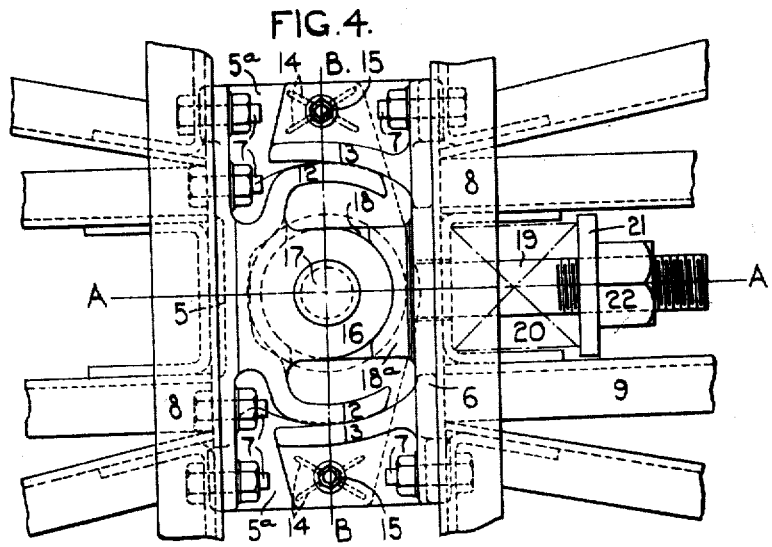
FIG. 5.
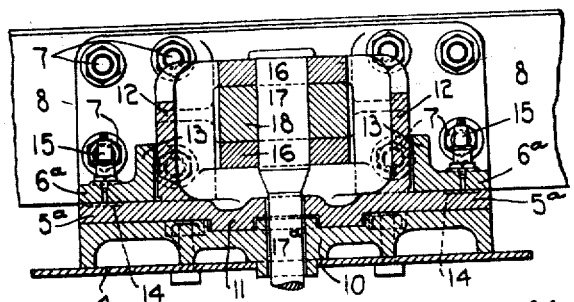
Inventor
Herbert N. Gresley,
by Herbert N. Jenner,
Attorney.

UNITED STATES PATENT OFFICE.

HERBERT NIGEL GRESLEY, OF DONCASTER, ENGLAND, ASSIGNOR TO THE LEEDS FORGE COMPANY, LIMITED, OF LEEDS, YORK, ENGLAND, A BRITISH COMPANY.

RAILWAY AND TRAMWAY VEHICLE.

1,412,053. Specification of Letters Patent. Patented Apr. 11, 1922.

Application filed April 26, 1921. Serial No. 464,620.

*To all whom it may concern:*

Be it known that I, HERBERT NIGEL GRESLEY, a subject of the King of Great Britain and Ireland, residing at Doncaster, England, (whose post-office address is Avenue House, Doncaster, in the county of York, England,) have invented certain new and useful Improvements in or Relating to Railway and Tramway Vehicles; and I do hereby declare the following to be a full, clear, and exact description of the invention, such as will enable others skilled in the art to which it appertains to make and use the same.

This invention has reference to railway and tramway vehicles of the kind in which the adjacent ends of two vehicles are supported by one common bogie, the other end of either or each of the said vehicles being supported on an independent bogie, or on another bogie which also supports one end of another vehicle.

In an arrangement of this kind described in the specification of my prior British Letters Patent No. 4512 of 1907 the two vehicles are supported on and articulated to their common supporting bogie through brackets fixed to the vehicle ends and so formed as to engage one with the other and thereby serve as a coupling or connection between the vehicles.

The object of the present invention is to provide an arrangement in which the two vehicles whilst supported on the common bogie by brackets fixed to the respective ends of the two vehicles are connected by draw gear comprising a draw spring or springs so that in a train of vehicles the pull at starting is taken up vehicle by vehicle through the draw springs and gear thereby enabling the load to be advantageously taken up gradually at starting instead of the whole load being taken up at once as is the case where the supporting brackets also constitute the coupling means as described in the said prior specification which do not provide for the movements necessary when draw springs are employed.

A further object of the invention is to provide an improved construction and arrangement of supporting brackets embodying lateral co-acting bearing surfaces of considerable area for taking the weight of the vehicles and transmitting the same to the bogie, means being provided for the efficient lubrication of such surfaces. In this way it may be possible to dispense with side brackets fixed to the adjacent ends of the two vehicles, and that either rest on bearing plates fixed to the spring bolster of the supporting bogie as described in the said prior British patent specification No. 4512 of 1907 or bear one upon the other as described in another specification of British Letters Patent granted to me.

For the said purposes, according to the invention, the adjacent ends of the two vehicles connected together by draw gear comprising a draw spring or springs, are supported upon the common bogie by brackets or the like fixed to the respective vehicle ends and mutually engaging one another so as to prevent relative movement in a lateral direction whilst capable not only of relative angular movement to allow for movement of the two vehicles about the axis of the centre casting or swivel plate of the common bogie but also capable of relative longitudinal movement to allow for movements due to compression of the draw springs.

One embodiment of such an arrangement comprises a bracket or the like fixed to one vehicle end and adapted to rest on the bogie centre casting or swivel plate and formed with an upwardly extending part-cylindrical boss or part-annular flange embraced by laterally projecting parts of another bracket or the like fixed to the end of the other vehicle and resting upon the first mentioned bracket or the like, the arrangement being such that the two brackets can turn relatively to each other about the axis of the bogie centre casting or swivel plate as well as move longitudinally relatively to each other to provide for compression of the draw springs. A coupling pin carried by the bracket or the like fixed to one vehicle engages an eye on the head of a draw bar carried by the other vehicle and associated with a draw spring or springs. The coupling pin may extend centrally through the bogie centre casting or swivel plate and constitute the king bolt or pivot of the bogie.

To limit the relative angular movements of the two vehicles about the axis of the bogie centre casting or swivel plate, security chains may connect the adjacent headstocks of the two vehicles near the sides of the vehicles.

If desired side buffers may be fitted so that one or other is compressed when the vehicles are travelling on curved portions of track.

Fig. 1 of the accompanying illustrative drawings shows in side elevation the adjacent ends of two railway passenger vehicles supported upon a common bogie, by means embodying the invention.

Fig. 3 is a central vertical longitudinal section on the line A, A of Fig. 4, of the supporting and coupling arrangement.

Fig. 4 shows the supporting and coupling arrangement in plan, and

Fig. 5 is a transverse section corresponding to the line B, B of Fig. 4.

Figure 1:
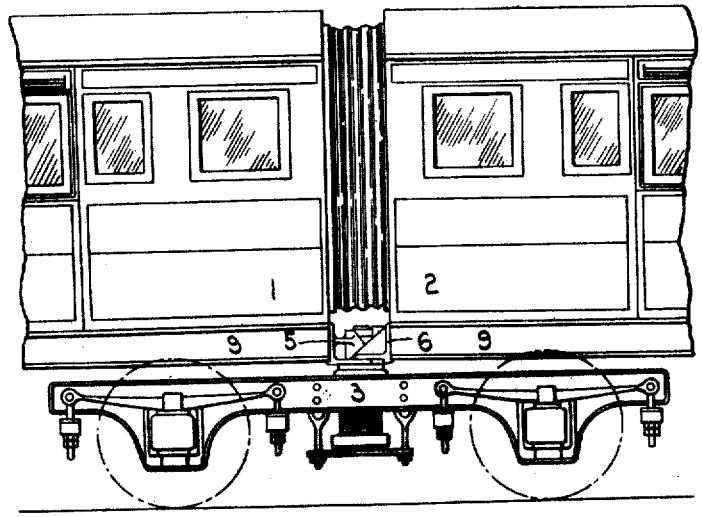
Figure 2:
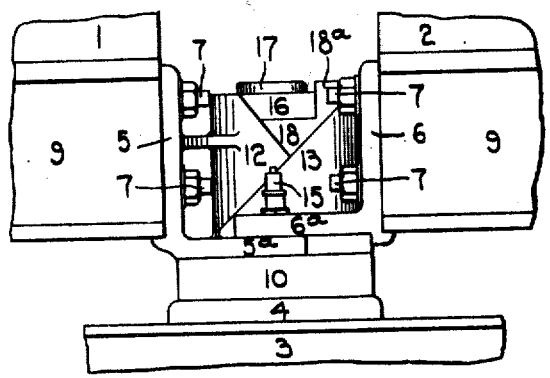
Fig. 2 shows in side elevation, to a larger scale, the supporting and coupling arrangement.

1 and 2 indicate the ends of the two vehicles, 3 the bogie, supporting the same through the spring bolster 4, and 5, 6, the brackets fixed by bolts 7 to the headstocks 8 of the vehicle underframes 9.

The bracket 5 has a horizontal base 5ª which rests directly upon the centre casting or swivel plate 10 of the bolster 4, and which is formed with an annular downwardly extending projection 11 that engages a corresponding annular recess formed in the bolster centre casting or swivel plate 10. Curved upwardly projecting flanges or webs 12 that connect the vertical wall of the bracket 5 to the base 5ª thereof, form a part cylindrical boss the axis of which is in line with the axis of the bogie centre casting or swivel plate 10, and these curved flanges or webs are embraced by corresponding curved flanges or webs 13 connecting the horizontal base portions 6ª of the bracket 6 to the vertical wall of such bracket. The curvature of the flanges or webs 13 does not extend beyond the point of greatest diameter of the curved flanges or webs 12 so that whilst these mutually engaging flanges or webs 12 and 13 prevent any relative side movement of the two brackets and therefore of the two vehicle ends to which the brackets are fixed, they do not prevent relative longitudinal movement of the brackets when the one vehicle is pulled away from the other as in the compression of the draw spring hereinafter referred to, neither do they prevent free relative angular movement of the brackets about the axis of the bogie centre casting or swivel plate. The horizontal base portions 6ª of the bracket 6 rest and work on the laterally extended side portions of the base 5ª of the bracket 5 and to reduce friction the upper faces of said side portions have formed in them grooves 14 to which lubricant is supplied through grease cups 15 screwed into the horizontal base portions 6ª of the brackets 6.

Projecting from the vertical wall of the bracket 5 is a forked boss 16 the horizontally extending jaws of which are formed with holes to receive a coupling pin 17 the axis of which is in line with the axis of the centre casting or swivel plate 10 of the bolster 4. The jaws of the forked boss 16 embrace the head 18 of a draw bar 19 which extends through the bracket 6 and the headstock 8 of the corresponding vehicle 9, a draw spring 20, preferably of the well-known concentric india rubber ring type, being mounted on the draw bar 19 between the back of the headstock 8 and a bearing washer 21 which is backed by a nut 22 on the inner end of the draw rod. The coupling pin 17 passes through a hole formed therefor in the head 18 of the draw bar 19, and, as will be seen, the forked boss 16, coupling pin 17, and draw bar head 18 are located centrally within the part annular wall formed by the flanges or webs 12.

Normally the draw spring 20, which is considerably stressed by adjustment of the nut 21, pulls the head 18 inwardly so that a flange 18ª thereon is pressed against the bracket 6. When, however, the spring 20 is compressed during a drawing operation the bracket 6 is pulled away from the head flange 18ª. If desired a rebound spring may be fitted on the draw bar 19 or a cushioning pad of india-rubber may be interposed between the head flange 18ª and the bracket 6.

In the apparatus illustrated the coupling pin 17 is formed with a downward extension 17ª that constitutes the king bolt or pivot of the bogie and engages holes formed therefor in the base 5ª of the bracket 5 and in the centre casting or swivel plate of the bogie bolster 4.

It will be seen that the co-acting surfaces of the webs or flanges 12 and 13 of the brackets 5 and 6 prevent relative lateral movement of the adjacent ends of the vehicles, whilst allowing free angular movement about the coupling pin and king bolt 17, 17ª, as also free relative longitudinal movement when the draw spring 20 is compressed. The arcuate guides 12 and 13 permit the draw bar 19 to slide longitudinally and compress the spring 20, and the springs 20 in a train of cars relieve the engine of great strain in starting, which is found to be very advantageous.

Supporting and coupling means as hereinbefore described may vary considerably in details of construction as will be understood without departure from the invention.

What I claim as my invention and desire to secure by Letters Patent is:—

1. The combination, with the adjacent end portions of two cars, and a supporting carriage arranged under them; of brackets secured to the ends of the cars and provided with arcuate guides which permit one car to move longitudinally and pivotally relative to the other car and which prevent relative lateral movement between the cars, and a spring-controlled draw bar slidable in one of the said brackets and pivoted to the other bracket concentric with the said arcuate guides.

2. The combination, with the adjacent end portions of two cars, and a supporting carriage arranged under them and provided with a bolster; of brackets secured to the ends of the cars and provided with arcuate guides which permit one car to move longitudinally and pivotally relative to the other car and which prevent lateral movement between the cars, means which connect one bracket pivotally with the said bolster, and a spring-controlled draw bar pivoted to the last said bracket concentric with the said arcuate guides, said draw bar being slidable longitudinally in the other bracket.

3. The combination, with the adjacent end portions of two cars, and a supporting carriage arranged under them; of brackets secured to the ends of the cars and provided with arcuate guides the contacting parts of which are portions of vertically arranged cylinders, said guides operating to prevent one car from moving laterally of the other car and to permit one car to move longitudinally and pivotally relative to the other car, and a spring-controlled draw bar slidable in one of the said brackets and pivoted to the other bracket concentric with the said arcuate guides.

4. The combination, with the devices as set forth in claim 1, of horizontally arranged base portions on the said brackets, said base portions being arranged to overlap and bear on each other, and the lower base portion being arranged to bear on the upper part of the supporting carriage.

In testimony whereof I affix my signature, in presence of two witnesses.

HERBERT NIGEL GRESLEY.

Witnesses:
BEN DAY,
EDWARD FLETCHER.